United States Patent
Gentile et al.

(10) Patent No.: US 11,674,699 B2
(45) Date of Patent: Jun. 13, 2023

(54) METHOD FOR PRODUCTION OF WATER FROM AIR BASED ON LOW-TEMPERATURE HEAT, AND MACHINE AND SYSTEM THEREOF

(71) Applicant: Politecnico Di Torino, Turin (IT)

(72) Inventors: Vincenzo Maria Gentile, Monreale (IT); Marco Simonetti, Turin (IT); Giovanni-Vincenzo Fracastoro, Turin (IT)

(73) Assignee: Politecnico Di Torino, Turin (IT)

( * ) Notice: Subject to any disclaimer, the term of this patent is extended or adjusted under 35 U.S.C. 154(b) by 0 days.

(21) Appl. No.: 16/754,477

(22) PCT Filed: Oct. 1, 2018

(86) PCT No.: PCT/IB2018/057605
§ 371 (c)(1),
(2) Date: Apr. 8, 2020

(87) PCT Pub. No.: WO2019/082000
PCT Pub. Date: May 2, 2019

(65) Prior Publication Data
US 2020/0340693 A1    Oct. 29, 2020

(30) Foreign Application Priority Data

Oct. 24, 2017 (IT) .......... 102017000120788

(51) Int. Cl.
*F24F 3/14* (2006.01)
*B01D 53/26* (2006.01)

(52) U.S. Cl.
CPC .......... *F24F 3/1423* (2013.01); *B01D 53/261* (2013.01); *B01D 53/265* (2013.01); *B01D 2257/80* (2013.01); *B01D 2259/4009* (2013.01)

(58) Field of Classification Search
CPC ........ F24F 3/14; F24F 3/1423; B01D 53/261; B01D 53/265; B01D 2257/80; B01D 2259/4009
See application file for complete search history.

(56) References Cited

U.S. PATENT DOCUMENTS 3,334,056 A    8/1967 Fisher et al.
3,400,515 A    9/1968 Ackerman
(Continued)

FOREIGN PATENT DOCUMENTS

CN    103900289 A    7/2014
CN    204593628 U    8/2015
(Continued)

OTHER PUBLICATIONS

International Preliminary Report on Patentability dated Apr. 28, 2020, issued in PCT Application No. PCT/IB2018/057605, filed Oct. 1, 2018.
(Continued)

*Primary Examiner* — Youngsul Jeong
(74) *Attorney, Agent, or Firm* — Workman Nydegger

(57) ABSTRACT

A method for production of water from air includes cyclically and successively repeating the following two phases: a first phase a), which includes the following steps: a1) taking air from the outside, a2) conveying the air towards an enthalpic exchanger containing an adsorbent material that internally accumulates the moisture that is present in the air, a3) outputting dry air, and a second phase b), which includes the following steps: b1) supplying heat to the enthalpic exchanger by way of a low-temperature heat source, b2) conveying an air flow through the enthalpic exchanger, wherein the air in contact with the enthalpic exchanger is heated and at the same time collects the moisture contained in the adsorbent material, and b3) bringing the heated and humidified air flow to ambient temperature in order to cause
(Continued)

the moisture contained therein to condense, thereby obtaining water.

6 Claims, 8 Drawing Sheets

(56) References Cited

U.S. PATENT DOCUMENTS

| | | | |
|---|---|---|---|
| 3,850,592 | A | 11/1974 | Huffman |
| 4,146,372 | A | 3/1979 | Growth et al. |
| 4,365,979 | A | 12/1982 | Takeyama et al. |
| 4,433,552 | A | 2/1984 | Smith |
| 5,203,989 | A | 4/1993 | Reidy |
| 5,846,296 | A | 12/1998 | Krumsvik |
| 6,230,503 | B1 | 5/2001 | Spletzer |
| 6,336,957 | B1 * | 1/2002 | Tsymerman ............. E03B 3/28 95/95 |
| 6,481,232 | B2 | 11/2002 | Faqih |
| 6,684,648 | B2 | 2/2004 | Faqih |
| 6,828,499 | B2 | 12/2004 | Max |
| 6,868,690 | B2 | 3/2005 | Faqih |
| 6,945,063 | B2 | 9/2005 | Max |
| 7,043,934 | B2 | 5/2006 | Radermacher et al. |
| 7,121,101 | B2 | 10/2006 | Merritt |
| 8,118,912 | B2 | 2/2012 | Rodriguez et al. |
| 8,221,514 | B2 | 7/2012 | Abramov |
| 8,584,480 | B1 | 11/2013 | Butkus |
| 8,627,673 | B2 | 1/2014 | Hill et al. |
| 9,057,557 | B2 | 6/2015 | Tudor |
| 2006/0005561 | A1 | 1/2006 | Murphy et al. |
| 2006/0065001 | A1 | 3/2006 | Bernardo Castanon Seoane |
| 2008/0022694 | A1 | 1/2008 | Anderson et al. |
| 2008/0184720 | A1 | 8/2008 | Morgan et al. |
| 2008/0314062 | A1 | 12/2008 | Ritchey |
| 2009/0077992 | A1 | 3/2009 | Anderson et al. |
| 2009/0145140 | A1 | 6/2009 | Shapiro |
| 2009/0151368 | A1 * | 6/2009 | Bar ...................... B01D 5/0039 62/94 |
| 2009/0293513 | A1 | 12/2009 | Sullivan |
| 2010/0083673 | A1 | 4/2010 | Merritt |
| 2011/0094196 | A1 | 4/2011 | Abramov |
| 2016/0131372 | A1 | 5/2016 | Choi et al. |
| 2018/0209123 | A1 | 7/2018 | Bahrami et al. |

FOREIGN PATENT DOCUMENTS

| | | |
|---|---|---|
| CN | 105805869 A | 7/2016 |
| CN | 107735531 A | 2/2018 |
| EP | 2594327 A1 | 5/2013 |
| WO | 2005/103577 A1 | 11/2005 |
| WO | 2015/005791 A1 | 1/2015 |
| WO | 2016/187709 A1 | 12/2016 |

OTHER PUBLICATIONS

International Search Report dated Nov. 28, 2018, issued in PCT Application No. PCT/IB2018/057605, filed Oct. 1, 2018.
Written Opinion dated Nov. 28, 2018, issued in PCT Application No. PCT/IB2018/057605, filed Oct. 1, 2018.
Chinese Office Action dated Aug. 3, 2022, issued in CN Application No. 201880069307.3.

* cited by examiner

METHOD FOR PRODUCTION OF WATER FROM AIR BASED ON LOW-TEMPERATURE HEAT, AND MACHINE AND SYSTEM THEREOF

FIELD OF INVENTION

The present invention relates to techniques for extracting water from the atmosphere by exploiting mainly low-temperature heat.

More in detail, the invention tackles the problem of low water resources, which afflicts numerous countries in the world, through an efficient and economical method of extraction of water from the atmosphere, by exploiting mainly low-temperature heat, e.g. heat produced by means of solar thermal systems.

The invention proposes a method for extracting water from the atmosphere which is based on an innovative thermodynamic cycle.

In addition, the invention proposes a compact system for implementing said cycle, which is so sized as to meet the drinking and sanitary water requirements of a family or a group of people.

Such a cycle requires the use of extremely economical technologic and energetic resources, thus being also advantageous for small-scale applications, e.g. for supplying water to individual families or groups of people within contexts where no water resources are accessible.

BACKGROUND ART

Several patents exist which propose methods for extracting water from air by using different techniques based on consumption of electric or thermal energy from fossil sources.

The methods that are most effective in terms of producibility are highly energy-consuming, requiring large amounts of electric power or fossil fuels.

Other systems based on the exploitation of renewable energy suffer from some limitations as concerns their maximum capacity of extraction of water from air, combined with very large overall dimensions. For this reason, no technical applications exist which make use of such patents.

In both cases, the cost incurred for producing water from air is high, thus making it difficult to implement a technology based on existing methods, save from extremely few cases or anyway very large systems.

The technologies for producing water from the atmosphere are mainly based on two methods:
i) surface cooling;
ii) vapour condensation through desiccant systems.

i) Surface Cooling.

In the former case, a surface is cooled below the dew point of environmental air to activate the process of vapour condensation of the surface itself. The dew point depends on the local climatic conditions, and is typically under 12° C. The drier the climate, the lower this value.

These temperatures can be obtained:
(A) by means of refrigeration cycles, or
(B) by exploiting nocturnal radiative cooling.

The refrigeration machines of case (A) may be of various types:

Mechanical vapour compression machines, the compressors of which are supplied with electric energy. This technology is rather mature as regards both the reliability and the production cost of such systems, and is widely used in the field of environmental refrigeration and conditioning. The power to be supplied thereto can be produced through conventional systems based on exploitation of fossil resources (oil, gas, coal), o by means of alternative systems based on exploitation of renewable resources (solar energy, aeolian energy, biomass, etc.). In the former case, there are problems related to the environmental and economical sustainability of water production through consumption of fossil resources. In the latter case, the technological problems related to the coupling between renewable resources and vapour compression machines can only be solved by increasing the system installation costs, thus limiting the fields of application thereof.

Absorption-type refrigeration machines, which require a thermal supply for regenerating the cooling fluids used in the cycle. Such heat has a typical minimum supply temperature around 90° C. This thermal level can be provided by thermal waste from industrial production processes or conventional power production systems. As an alternative, low-temperature solar thermal systems can be used, but the required temperature limits the applicability thereof from an efficiency viewpoint, in that large plant surfaces are needed, leading to high installation costs. This factor strongly affects their application from an economical viewpoint. It should also be pointed out that, in many cases, absorption-type machines utilize particularly aggressive and toxic fluids, which pose a number of serious problems as far as system maintenance is concerned. As regards case (B), there exist systems that exploit nocturnal radiative cooling. These are passive systems that also exploit the thermal excursion between day and night. A surface exposed to the sky has a radiative emission in the infrared range, resulting in heat being yielded by the surface towards the sky. When this mechanism is combined with a climate characterized by broad nocturnal thermal excursions, temperatures can be reached on the exposed surface which are lower than the local dew conditions. Therefore, water vapour condenses on the surface, and water is collected and accumulated. Such systems have no energy consumption, but require large exposure surfaces to provide significant amounts of water.

ii) Use of Desiccant Systems.

These systems are based on increasing the hygrometric content of the air under treatment by raising the dew point value to ambient temperature.

The operation of such systems can be schematized into two phases:

Dehumidification phase, wherein a desiccant substance in contact with environmental air captures the water vapour thereof and releases it, dehumidified, into the environment. Water vapour is accumulated into the desiccant substance until a saturation condition is reached, upon which the vapour transfer mechanism is interrupted.

Regeneration phase, wherein, by applying heat to the saturated desiccant material, the mass transfer mechanism is reversed and the water vapour moves from the desiccant substance into the environmental air, thus increasing the moisture content thereof. In this phase, if the dew point of the air is sufficiently high, the water vapour will condense on a surface at ambient temperature.

Various desiccant materials exist, which may be either liquid or solid. Typically, these materials are used at industrial level for dehumidifying process air or for separating hydrocarbon compounds.

The following will list a number of patent documents that were found and analyzed, with a brief description and the most important drawbacks that were identified.

U.S. Pat. No. 3,299,651 (1967) "System for providing air conditioning and producing fresh water", describes a vapour compression machine that condenses air pre-humidified at the evaporator. At the condenser, it uses evaporative cooling techniques with brackish/non-pure water. The reference technology and the thermodynamic cycle refer to heat pumps. Ambient dew conditions are reached by surface cooling. The system is based on consumption of electric power.

U.S. Pat. No. 3,334,026 (1967) "Producing fresh water from air raised to high humidity by exposure to water vapor from contaminated sources of water" describes the production of fresh water from a stream having a high moisture content. Atmospheric air is first heated and then humidified by exposure to a non-pure water stream. Finally, the air is cooled to condense the water contained therein. The system requires a non-potable water source. It is not applicable to desert places.

U.S. Pat. No. 3,400,515 (1968) "Production of water from atmosphere" describes the production of water directly from atmospheric air through the use of simple means. A hydrophilic system (MgSO4*7H2O) storing humidity during the night is then dried by direct exposure to solar radiation. The water condenses on collection cones. This is a passive system characterized by low producibility. When sized for producibility levels comparable to the reference ones, the system will be considerably bulky.

U.S. Pat. No. 7,043,934B2 (2006) "Device for collecting water from air" describes a system for collecting water from air combined with different air conditioning systems. The treatment systems are: a) vapour compression machine, with or without a heat recovery unit upstream and downstream of the evaporator; with a single or double fan for air movement and b) an open-air DEC system for condensing the regeneration air downstream of the wheel. Regeneration of the desiccant wheel is isoenthalpic. The system coupled to the heat pump has a high power consumption.

U.S. Pat. No. 8,584,480B1 (2013) "Adaptable water harvesting apparatus" describes a system wherein ambient air is cooled to the dew point with the aid of an absorption machine to which waste heat from a diesel engine is supplied. The system is sized for supplying potable and sanitary water to 550 troops of the American army, and is coupled to an 840 kW diesel engine. Therefore, the system uses fossil fuels.

U.S. Pat. No. 7,121,101B2 (2006) "Multi purpose adiabatic potable water production apparatus and method" describes a system based on reaching dew conditions through a vapour compression machine. The system provides two-stage cooling at decreasing temperatures in order to increase the amount of water that can be extracted from the air stream. It uses an electrically powered heat pump.

U.S. Pat. No. 4,146,372 (1979) "Process and system for recovering water from the atmosphere" describes a system wherein water is recovered from air through an adsorption/absorption process, based on silica gel, which exploits the temperature difference between day and night. Solar radiation is used for heating the air in order to regenerate the material. The reference transformation is isoenthalpic. In order to ensure good producibility, the system occupies considerable installation surface and volume.

U.S. Pat. No. 4,365,979 (1982) "Water producing apparatus" describes a system wherein the cycle is based on typical DEC systems with a dehumidifying rotor. Regeneration air and adsorption air flow in parallel in different portions of the rotor. The reference transformation is isoenthalpic. Regeneration temperature is high. The parallel and simultaneous operation of the air streams involves high adsorption rates, resulting in problems of load losses, and hence considerable power consumption.

U.S. Pat. No. 5,203,989 (1993) "Potable air-water generator" describes an embedded system for production of water from air, through the use of a heat pump, integrated with a filtering and potabilization system. The system uses a vapour compression machine for reaching ambient dew conditions. The machine is mainly powered by electric energy.

U.S. Pat. No. 5,846,296 (1998) "Method and device for recovering water from a humid atmosphere" describes a method for recovering water from air or for purifying a polluted source by exploiting adsorbent materials in a closed environment. The system is enclosed in a glass structure that allows the passage of solar radiation for material regeneration. The system is of the passive type. The reference transformation has low producibility. The operation of the system is only based on day-night alternation.

U.S. Pat. No. 6,230,503B1 (2001) "Method and apparatus for extracting water from air" describes a method and an apparatus for extracting liquid water from moist air. The system is based on a mechanism of compression, cooling at ambient temperature, and decompression of a finite volume of air for condensing the amount of water contained therein. The system is powered by mechanical energy, which requires that the energy supplied to the system be of higher quality (electric energy).

U.S. Pat. No. 6,336,957B1 (2001) "Method and apparatus for extracting water from atmospheric air" describes a method and an apparatus for extracting water from atmospheric air, through the use of solid or liquid absorbent substances. The material is cyclically heated and cooled to change the pressure in a sealed chamber, thereby causing a variation in water vapour pressure. The method is based on pressure variations that require pressure-tight seals. In order to condense the water it is necessary to create a partial vacuum, with considerable installation complexity and high operating temperatures.

U.S. Pat. No. 6,481,232B2 (2002) "Apparatus and method for cooling of closed spaces and production of freshwater from hot and humid air" describes a method and a system for combined production of cold for closed spaces and collection of condensed water for applications in hot and humid climates. The system is based on reaching the dew conditions of the atmospheric environment.

U.S. Pat. No. 6,684,648B2 (2004) "Apparatus for the production of fresh water from extremely hot and humid air" describes a system that uses a conventional vapour compression refrigeration machine for condensing water from air. In addition, an ultraviolet/activated carbon potabilization system makes water usable also in situations of emergency. The system is based on reaching the dew conditions of the atmospheric environment. Operating temperatures are high. The system requires considerable electric energy to obtain the specified production rates.

U.S. Pat. No. 6,868,690B2 (2005) "Production of potable water and freshwater needs for human, animal and plants from hot and humid air" describes a system that combines different technologies for reaching the environmental dew conditions in order to condense water from air. A water potabilization system is associated with these systems in order to remove particulate and other pollutants. The system is based on reaching the dew conditions of the atmospheric environment.

U.S. Pat. No. 8,118,912B2 (2012) "Low power atmospheric water generator" describes a system that uses dehumidifying rotors in order to capture moisture from ambient air, which rotors are then regenerated to condense the produced vapour. A water treatment and purification system is provided downstream. Regeneration of the dehumidifying material is isoenthalpic. The system is characterized by high regeneration temperatures and low producibility.

US2006/0005561A1 (2006) "Condensed water production system" describes a system wherein ambient air is first filtered and then cooled to the dew point, and the water vapour thereof is then condensed. The latter is collected and further treated for potabilization. The cooling system uses electrically powered vapour compression machines. The primary energy source is electric. Applicability in underdeveloped countries is poor.

US2008/0022694A1 (2008) "Water producing method and apparatus with additive control system" describes a system for production of potable water from air condensate. Water is purified from particulate, pollutants and bacteria. Condensate is produced by means of conventional vapour compression systems. The document focuses on the configuration of the system for integrating the potabilization system with the refrigeration machine.

US2008/0314062 (2008) "Water condenser" describes a system that uses a conventional vapour compression refrigeration machine for condensing water from air. The system is based on reaching the dew conditions of the atmospheric environment. The system requires considerable electric energy for delivering the necessary production rates.

US2009/0293513A1 (2009) "Machines and methods for removing water from air" describes a system that uses a conventional vapour compression refrigeration machine for condensing water from air. The system is based on reaching the dew conditions of the atmospheric environment.

U.S. Pat. No. 4,433,552 (1984) "Apparatus and method for recovering atmospheric moisture" describes a method and an apparatus for recovering moisture from the atmosphere by using a wind-driven electrical generator for powering a vapour compression refrigeration machine for condensing moisture. The system is powered by aeolian renewable energy. Condensation of water from air is obtained by reaching the ambient dew point.

U.S. Pat. No. 6,828,499B2 (2004) "Apparatus and method for harvesting atmospheric moisture" describes a condensation panel used for harvesting water. It exploits those times of the diurnal cycle (night, morning) when humidity is near 100% and little cooling is necessary to condense the vapour. It utilizes photovoltaic energy for powering a Peltier cell. The system is based partly on the principle of radiative cooling and partly on Peltier cells for cooling surfaces with small volumes.

U.S. Pat. No. 6,945,063B2 (2005) "Apparatus and method for harvesting atmospheric moisture" describes a system for production of water from the atmosphere in environments with high relative humidity. The temperature of a surface is reduced to promote condensation in a confined moist environment. The system includes a photovoltaic panel that generates electricity for activating the cooling system. The system has been conceived for roof installation. In dry environments its effectiveness would be very poor.

U.S. Pat. No. 8,221,514B2 (2012) "Ecologically clean method and apparatus for water harvesting from air" describes a method based on the change occurring in the thermodynamic state of ambient air when the latter is subjected to a whirling motion through converging/diverging nozzles. Application is mainly focused on aircraft systems.

U.S. Pat. No. 8,627,673B2 (2014) "Atmospheric water harvesters" describes a system for production of water from the atmosphere which includes a vapour compression cooling system. The system is based on reaching the dew conditions of the atmospheric environment. The system is powered by electric energy.

U.S. Pat. No. 9,057,557B2 (2015) "Apparatus and method to recover and dispense potable water" describes an apparatus and a system for producing purified drinking water from humid air. The apparatus includes a refrigeration machine and a germicidal system. The system can also dehumidify, improve air quality, and provide air conditioning. The system is based on reaching the dew conditions of the atmospheric environment. The system is powered by electric energy.

US2006/0065001A1 (2006) "System and method for extracting potable water from atmosphere" describes a system for production of potable water by cooling surfaces below the dew point. The system is based on reaching the dew conditions of the atmospheric environment.

US2008/0184720A1 (2008) "Combination dehydrator and condensed water dispenser" describes a system for supplying potable water, coupled to a cooling battery supplied by a vapour compression machine. A purification system provides the treatment for potabilization of condensed water. The system is based on reaching the dew conditions of the atmospheric environment. The system is powered by electric energy.

US2009/0077992 A1 (2009) "Water producing method and apparatus" describes a system for production of water condensed from air and for purification and sterilization thereof. The system is based on reaching the dew conditions of the atmospheric environment. The system is powered by electric energy.

US2010/0083673A1 (2010) "Water production system and method with air bypass" describes an apparatus and a method for condensing water vapour in air, which comprises ducts, air movement systems, and a refrigeration system. The system is based on reaching the dew conditions of the atmospheric environment. The system is powered by electric energy.

US2011/0094196A1 (2011) "Ecologically clean method and apparatus for water harvesting from air" describes an ecological machine for condensing humid wind. The system includes a cascade of sequential horn-tubes and wing-like profiles. These impart to the air stream eddying motions that reduce its temperature to the environmental dew conditions.

This field can therefore be said to be quite active, but no optimal solutions have been found yet which are fully satisfactory in terms of low cost, negligible power consumption, and use in arid environments.

Shortage of potable water is a particularly critical problem in North Africa, in the Middle East, and in the central and southern regions of Asia.

Conventional distillation and/or desalination systems, such as Multi-Stage-Flash and Reverse Osmosis, are characterized by high energy consumption and considerable running costs, which is the reason why large plants are not economically sustainable.

Most potabilization plants based on the above-mentioned methods are powered from fossil resources, with a strong environmental (emission of pollutants) and economical impact.

It must also be pointed out that, at any rate, these technologies require the availability of liquid, though polluted, water.

This condition is not always met, especially in dry regions.

OBJECT AND SUMMARY

A need is therefore felt for solutions that may overcome the above-mentioned drawbacks.

The solution proposed herein allows overcoming the drawbacks of the prior art by means of a method according to claim 1.

The solution proposed herein concerns also a machine and a system for obtaining water from air according to claims 6 and 10.

In the proposed solution, the air flow can be condensed at ambient temperature, thus avoiding the use of refrigeration machines.

BRIEF DESCRIPTION OF THE DRAWINGS

Further features and advantages of the invention will be illustrated in the following detailed description, which is provided merely by way of non-limiting example with reference to the annexed drawings, wherein.

DETAILED DESCRIPTION

Figure 1:
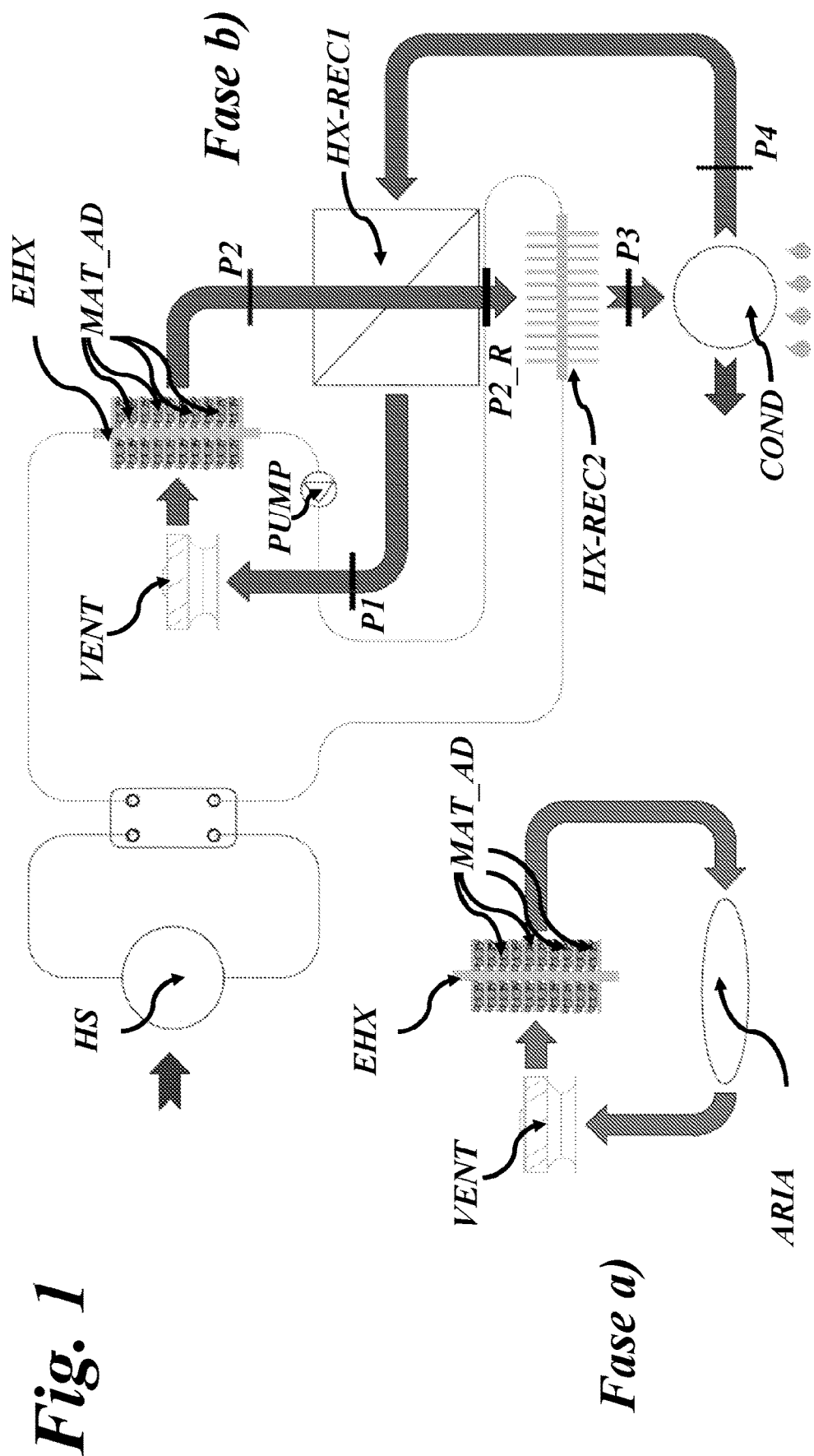
FIG. 1 shows an exemplary conceptual scheme of the operation of the solution described herein, which comprises a phase a) and a phase b)

The following description will illustrate various specific details useful for a deep understanding of some examples of one or more embodiments. The embodiments may be implemented without one or more of such specific details or with other methods, components, materials, etc. In other cases, some known structures, materials or operations will not be shown or described in detail in order to avoid overshadowing various aspects of the embodiments. Any reference to "an embodiment" in this description will indicate that a particular configuration, structure or feature is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments as deemed appropriate.

The references below are therefore used only for simplicity's sake, and do not limit the protection scope or extension of the various embodiments.

The atmosphere, or rather the water contained therein, can be a solution to the above-mentioned problem.

The atmosphere is a huge and widespread renewable resource of potable water, and it has been estimated to contain approx. 12,900 km$^3$ of water in the form of water vapour. Since water is available in the vapour state, it is necessary to carry out a series of thermodynamic transformations in order to condense it into the liquid state.

Air is a mixture of different gaseous substances, including water vapour. The quantity of water vapour in the air is defined by its partial pressure Pv.

At given conditions of total air temperature and pressure, the partial pressure Pv does not exceed a limit value, called saturation pressure Ps.

Relative humidity RH is defined as a percent ratio between these terms: RH=Pv/Ps.

As temperature increases, the value of the saturation pressure Ps increases as well, thus improving the capability of containing water in vapour state.

By approximating vapour to a gas, it is possible to apply the thermodynamic relations of perfect gases PV=nRT to determine the vapour mass, the temperature and pressure conditions being known.

The parameter that defines the quantity of water per kilogram of air in specific terms is absolute humidity, indicated as "x", the unit of measure being gr_$H_2$O/Kg_air.

For example, at a temperature of 35° C. and a relative humidity RH=20% (typical conditions of a dry climate), the air contains about 7 grams of water per kilogram of air (x=7).

When the saturation condition is reached at the same temperature (35° C., 100%), specific humidity reaches 37 g/kg, i.e. x=37.

If air is brought to 50° C., upon saturation it will contain approximately x=87 g/kg.

On the contrary, in given conditions of temperature and partial pressure Pv, if some heat is subtracted, the temperature of the air mixture will progressively decrease and relative humidity RH will increase.

When relative humidity RH=100% is achieved, the so-called dew point is reached.

If more heat is subtracted, a condensation process will be activated, and water will switch from the vapour state to the liquid state.

In conclusion, therefore, in order to extract water from air it is necessary to reach the dew point.

Dry regions are characterized by a dew point in the range of 0-10° C. and an ambient temperature in the range of 30-45° C.

The use of an electrically powered refrigeration machine for subtracting heat within this range of temperatures requires considerable energy consumption.

By using specific components and materials, the solution proposed herein allows implementing a thermodynamic cycle that raises the dew point of the air to over 50° C.

In this manner, the air flow can be condensed at ambient temperature, thus avoiding the use of refrigeration machines.

The primary energy source of such a system is low-temperature heat, which is the most abundant and economical energetic resource that can be found.

The solution described herein exploits the ability of some desiccant materials to capture water vapour from air.

When these materials are brought in contact with ambient air, a dehumidification process is activated which transfers the water vapour from the air to the desiccant material.

This vapour-capturing mechanism ends when local equilibrium conditions are reached, which define the saturation condition of the desiccant material.

This process is reversible and it is possible, by supplying heat, to "regenerate" the desiccant or dehumidifying materials by removing the amount of water contained therein.

In this case, a transfer of water vapour from the desiccant or dehumidifying material to the surrounding air will occur.

Generally, heat is provided by the air itself, which is heated beforehand.

In order to be able to receive vapour into its mixture, the air must yield some heat to the desiccant or dehumidifying material, and this implies a temperature reduction.

This type of thermodynamic transformation is referred to as "isoenthalpic", i.e. a transformation in which enthalpy remains constant.

The air temperature reduction that occurs during the regeneration of the desiccant or dehumidifying materials reduces the saturation pressure Ps, and hence the water mass that can be contained in the mixture.

The moist air flow obtained from the regeneration of the desiccant or dehumidifying material can be cooled down to its dew point in order to activate the condensation process and obtain water in the liquid state.

In this case, the dew point will be higher than the temperature of the outside environment, because the hygrometric content of the air mixture will be greater than the atmospheric one.

Figure 2:
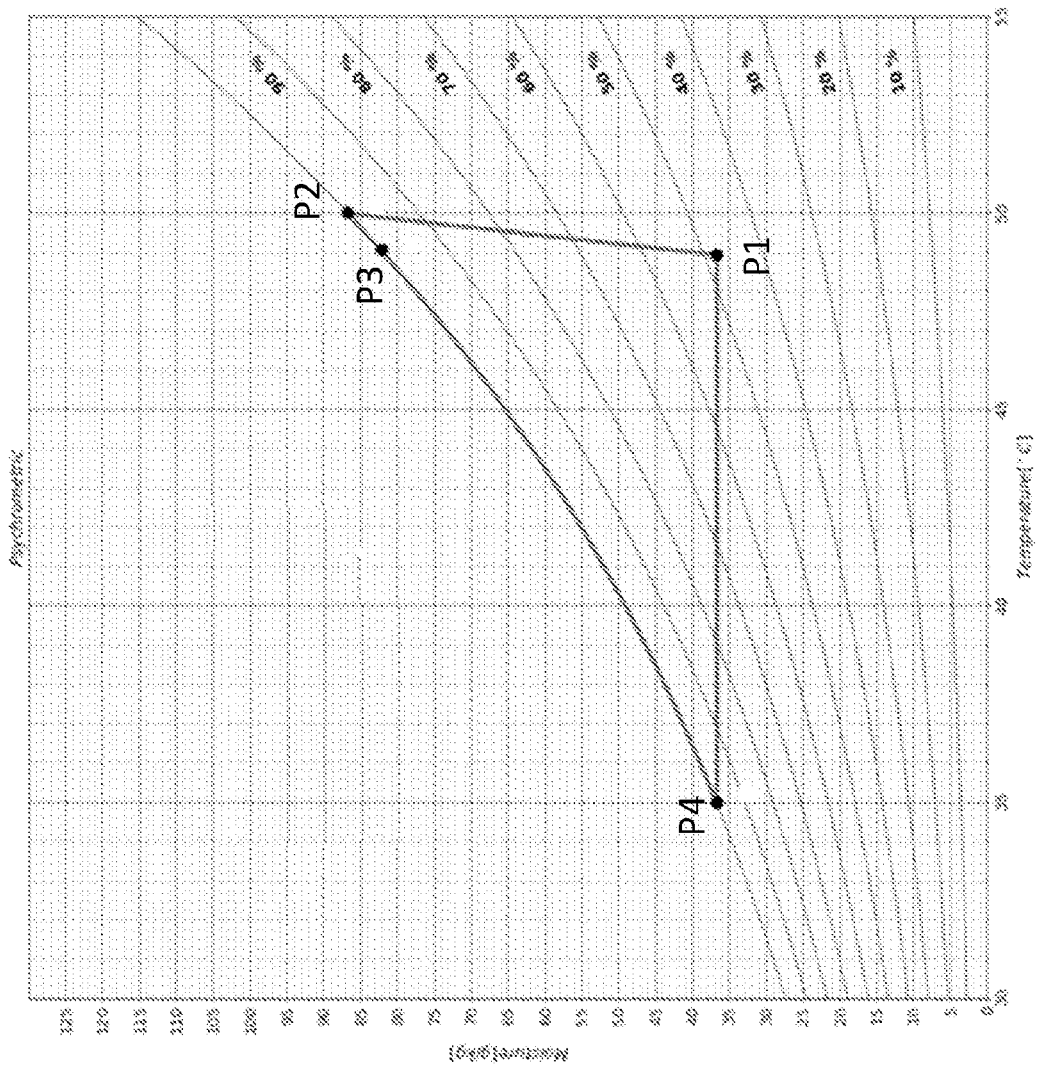
FIG. 2 and FIG. 3 are two graphs of the thermodynamic cycle.

The invention proposed herein is based on the cycle of a machine for extracting liquid water as schematized in FIG. 1 and represented in the psychrometric diagram of FIG. 2.

The solution according to the invention utilizes the alternation between two distinct phases, i.e. a) capturing water vapour from the atmosphere, or adsorption phase, and b) condensation of the captured vapour, or desorption phase.

The phenomenon considered herein is adsorption, i.e. relating to a solid.

Therefore, the proposed solution exploits the isothermal regeneration of the material that has adsorbed water, which isothermal transformation allows lowering the condensation temperature.

During the adsorption phase a), the machine allows exchanging heat and mass at the same time, and an enthalpic exchanger EHX is brought in contact with the outside ambient air indicated as AIR (i.e. the atmosphere).

The enthalpic exchanger EHX has a structure, which will be further described below, which is formed by a plurality of metal elements whereon an adsorbent (desiccant or dehumidifying) material is arranged, indicated as MAT_AD.

The enthalpic exchanger EHX may also be made from other materials, e.g. high-conductivity plastic materials.

In particular, the adsorbent material MAT_AD may be provided in granular form, in the form of panels that cover the metal elements of the exchanger EHX, or in the form of a paint or coating that coats the metal elements of the exchanger EHX.

An air flow taken from the outside environment, i.e. from the atmosphere, laps the contact surface of the adsorbent material MAT_AD, i.e. the dehumidifying substance, which captures the water vapour thereof.

For example, a fan FAN may be used in order to convey the air in the desired direction, i.e. towards the metal elements coated with adsorbent material MAT_AD of the enthalpic exchanger EHX.

The air exiting the machine, obtained after the passage through the enthalpic exchanger EHX, can be either rejected into the environment or used for applications requiring dry air.

The air can be moved by mechanical means (e.g. a fan or blower) and/or by exploiting the natural convection motions of air.

The process carried out during the adsorption phase a) will then continue until the dehumidifying substance reaches the saturation condition in equilibrium with the ambient conditions.

As an alternative, the process carried out during the adsorption phase a) may be interrupted earlier, in accordance with the machine control logics.

In particular, the duration of phase a) will depend on the temperature of the air, the moisture contained therein, and the dimensions of the machine employed for extracting water from air.

At the end of the adsorption phase a), the desorption phase b) will start.

This desorption phase b) occurs at a low temperature, >50° C.

To the same enthalpic exchanger EHX heat is supplied through a thermal vector or a heat source HS, e.g. a hot air flow, which allows the regeneration of the adsorbent material MAT_AD acting as a dehumidifying substance.

In particular, the heat source HS heats an exchange fluid (such as air or a liquid) flowing and circulating in the enthalpic exchanger EHX.

The heat source HS may be solar energy, heat extracted from biomasses, or waste heat generated in other processes.

Therefore, a low-temperature (50° C.-80° C.) heat source HS is used.

Water vapour is released from the adsorbent material MAT_AD and yielded to an air flow lapping its contact surface.

The adsorbent material MAT_AD acting as a dehumidifying substance is in contact with a surface that also allows for exchanging sensible heat, e.g. the high-conductivity metal or plastic surface of the elements forming the enthalpic exchanger EHX.

The heat supplied by the heat source HS goes through the adsorbent material MAT_AD by conduction and is transmitted to the same air stream.

At the same time, this air stream receives a flow of sensible heat and a latent flow originated from the migration of the water from the adsorbent material MAT_AD to the air.

The temperature of the air increases from the initial temperature, and so does specific humidity.

Figure 3:
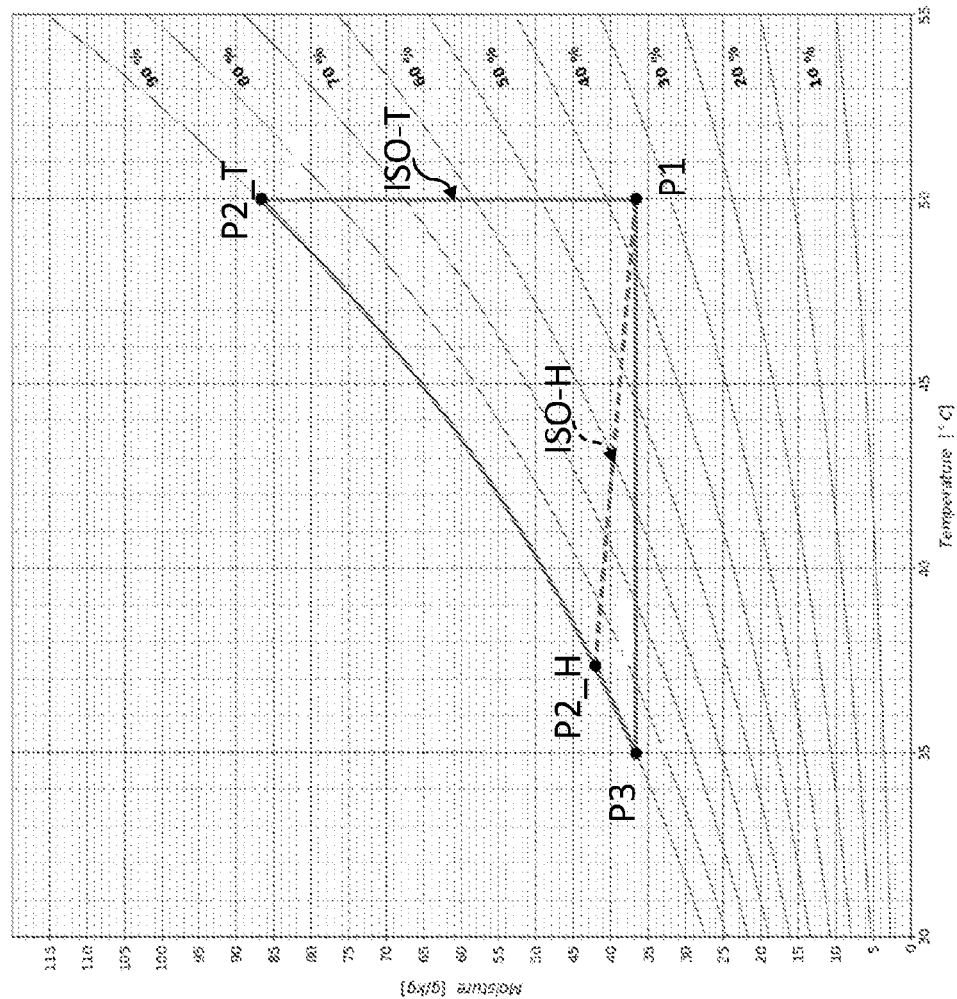

The thermodynamic transformation undergone by the air can be represented in the psychrometric diagram as a steeper line of the isoenthalpic transformation shown in FIG. 3.

With reference to FIG. 3, the following will describe the difference between isoenthalpic transformation and isothermal transformation.

In FIG. 3, the line of the abscissas shows the temperatures (° C.) and the line of the ordinates shows the absolute humidity values (gH$_2$O/kgair)

In systems already patented which are based on the use of adsorbent materials, the air is subjected to a transformation that, basically, can be defined as isoenthalpic, i.e. wherein variations in the latent content (humidity) occur at the expense of the sensible content (temperature).

This means that, when an adsorbent material is regenerated by exploiting an isoenthalpic transformation (line joining points P1-P2_H), the latent content, and hence the humidity, of the air will increase, while the sensible content, i.e. its temperature, will decrease.

Conversely, the cycle presented herein is based on an isothermal, as opposed to isoenthalpic, material regeneration.

This type of transformation offers a remarkable advantage, which can be intuitively guessed by comparing the two points P2_T (isothermal transformation) and P2_H (isoenthalpic transformation).

Point P2_T reaches distinctly greater values of absolute humidity, approx. 87 g/kg versus approx. 43 g/kg of the isoenthalpic transformation, starting from a temperature of 50° C.

Furthermore, in the isoenthalpic transformation case the sensible jump is really small (in the example, reference is made to an ambient temperature of 35° C.) in comparison with the isothermal transformation.

Consequently, dimensions and space occupation, as well as the specific costs of the system per water mass unit produced, are reduced when the thermodynamic cycle is based on an isothermal regeneration rather than an isoenthalpic one.

Still with reference to FIG. 1, the second desorption phase b) may include a first block HX_REC1 for heat recovery.

In particular, the first block HX_REC1 receives the air exiting the enthalpic exchanger EHX, indicated as reference P2, recovers the heat, and outputs two flows: the first flow P1, which is sent back to the inlet of the enthalpic exchanger EHX, and an air flow P2_R, which is sent to a second heat recovery block HX_REC2.

The air flow P2_R is sent to a second block HX_REC2 for heat recovery and, finally, to the condenser COND (heat sink), which condenses the water contained therein. At the inlet of the condenser COND there is the flow P3, which is condensed in a collection chamber.

In various embodiments, the flow P3 is sent back to the inlet of the first heat recovery block HX_REC1 as a flow P4.

The flows indicated in FIG. 1 by the symbols P1, P2, P3 and P4 are the air flows that are in the temperature and humidity conditions indicated in the psychrometric diagram of FIG. 2.

In particular, in one embodiment the same enthalpic exchanger EHX operates for a first period of time in the first adsorption phase a) and for a second period of time in the second desorption phase b).

If the quantity of sensible heat yielded to the air is such as to compensate for the temperature reduction caused by water evaporation, the transformation can be isothermal, i.e. at the same temperature, as shown in FIG. 3, and/or heated, as represented by the line that joins points P1-P2 in FIG. 2, if the quantity of sensible heat yielded is greater.

The air flow can be moved mechanically, e.g. by means of a fan FAN, FIG. 1, and/or by natural convection.

After having gone through the exchanger EHX, the flow arrives at point P2 and proceeds towards the condenser COND.

At point P2 the air flow has reached such conditions of temperature and humidity that a considerable amount of water can be condensed at the condenser COND (heat sink), even while yielding heat to the ambient temperature, e.g. 35° C.

For example, with an air flow of 100 m3/h it is possible to reach, at point P2, a temperature of 50° C. and a relative humidity of 100%.

By condensing this flow at an ambient temperature of 35° C., a flow rate of liquid water of approx. 0.1 lt/min is produced.

The air flow moves within a closed circuit and, after having gone through the condenser COND, at point P4, returns to the exchanger EHX (optionally after passing again through the first heat recovery block HX_REC1).

Figure 8:
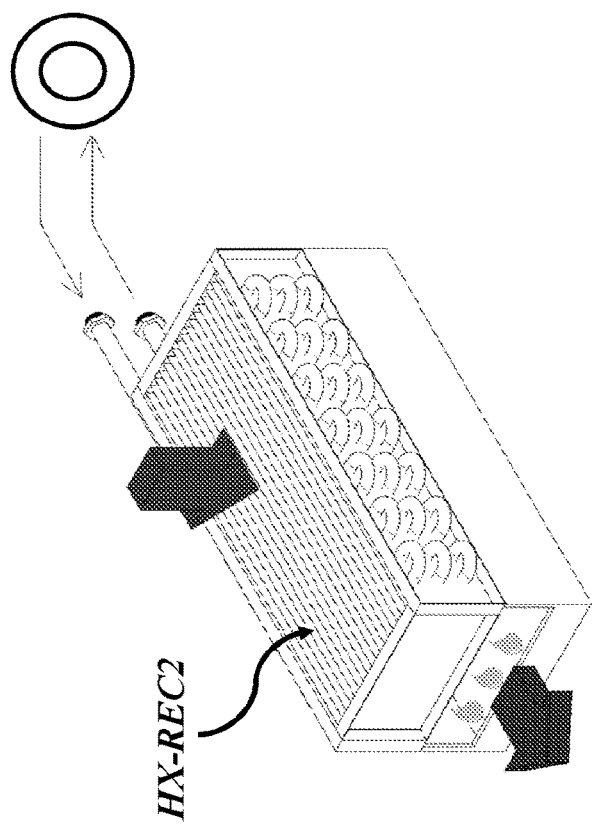

Between the exchanger EHX and the condenser COND a dual heat recovery system is interposed:
- an air/air heat exchanger, indicated as HX-REC1 (see FIG. 7); and/or
- a liquid/air heat exchanger, indicated as HX-REC2 (see FIG. 8).

The first heat recovery block HX-REC1 allows for thermal exchange between the air flow exiting HX-REC2, indicated as P2_R, and the air flow exiting the condenser COND, indicated as P4.

Therefore, the temperature of the air flow entering the exchanger EHX is higher than the condensation temperature.

The first heat recovery block HX-REC1 may be sized for reaching at most the temperature of point P2.

The second heat recovery block HX-REC2 is located downstream of the first heat recovery block HX-REC1 and allows recovering the heat from the condensing flow to the medium that supplies the heat produced by the heat source HS.

This recovery can take place, for example, by means of a closed water flow moved by the pump PUMP.

The heat necessary for regeneration must be supplied at temperatures only slightly higher than the maximum regeneration temperature, which in the example is 50° C.

This makes it also possible to use thermal solar systems, heat coming from thermal waste, or other low-temperature heat sources.

When the dehumidifying substance, i.e. the adsorbent material MAT_AD, has been completely regenerated, the desorption phase b) will end and the adsorption phase a) will start again.

As an alternative, the desorption phase b) may be interrupted earlier, in accordance with the system control logics.

During the adsorption phase a) there is no production of liquid water from the same exchanger EHX.

Therefore the air, as it flows through the machine, receives moisture from the adsorbent material (previously accumulated therein) and heat from the exchange fluid circulating in the exchanger EHX.

The air flowing therethrough is not in direct contact with the exchange fluid, but there is a metal or plastic surface having high contact conductivity. In particular, said contact surface comprises pipes or ducts, in which the exchange fluid flows, and fins or lamellar panels. Lamellar panels provide a considerable increase in contact and exchange area.

Figure 4:
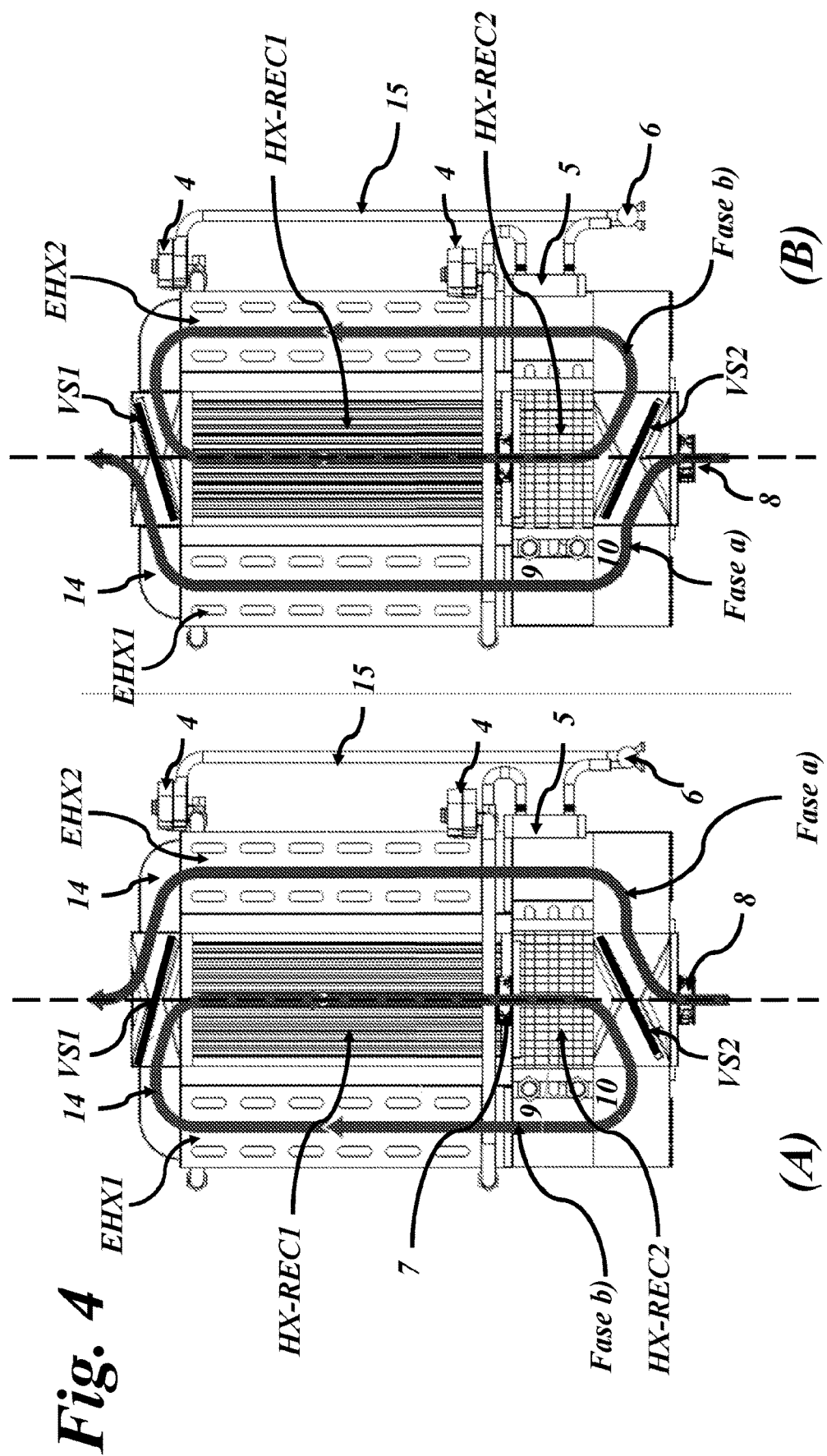
FIG. 4 shows an example of a system composed of two machines alternately working in the two phases a) and b)

In various embodiments of the invention it is possible to consider a system made up of two machines, i.e. a system comprising two enthalpic exchangers EHX1 and EHX2, as shown in FIG. 4. In the exemplary embodiment, the two enthalpic exchangers EHX1 and EHX2 have the recovery blocks HX-REC1 and HX-REC2 and the condenser block COND in common.

The system composed of the exchangers EHX1 and EHX2 is sized in such a way that the enthalpic exchange between the air and the dehumidifying substance will be continuous and extended for a long period of time.

In particular, with reference to FIG. 4, in the left-hand portion (A) the exchanger EHX1 is executing the second desorption phase b) and the exchanger EHX2 is executing the first adsorption phase a). Conversely, in the right-hand portion (B) the exchanger EHX1 is executing the first adsorption phase a) and the exchanger EHX2 is executing the second desorption phase b).

In this manner, there are no downtimes and the efficiency of liquid water production is increased.

Therefore, in FIG. 4 (A) the exchanger EHX1 is executing the water condensation cycle and the exchanger EHX2 is executing the step of capturing vapour from air. Conversely, in FIG. 4 (B) the exchanger EHX1 is executing the step of capturing vapour from air and the exchanger EHX2 is executing the water condensation cycle.

In order to ensure uninterrupted operation, the two exchangers EHX1 and EHX2 work in parallel in an alternate fashion.

Figure 5:
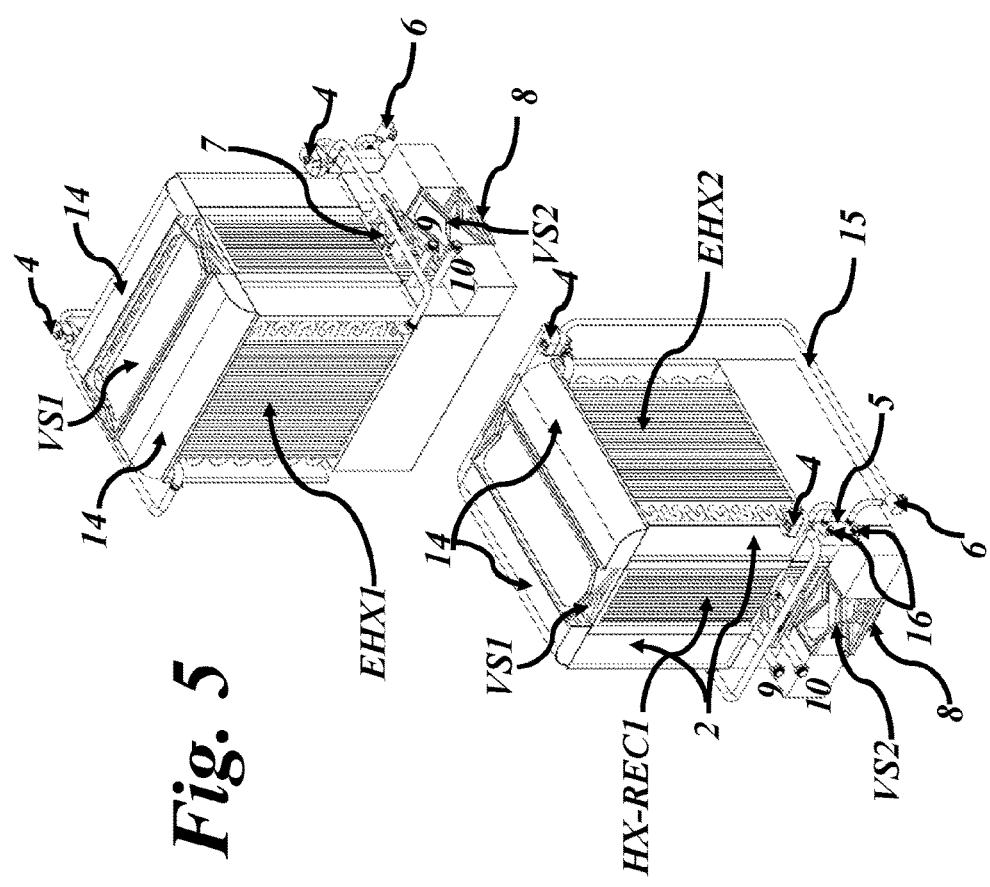
FIGS. 5, 10 and 11 show an embodiment of the system of FIG. 4, FIGS. 6, 7, 8 and 9 show some elements constituting the system of FIG. 4.

FIG. 5 shows, in schematic form, a configuration of a system that uses two exchanger EHX1 e EHX2 in alternate parallel operation, as already described in FIG. 4. In particular, all components are so arranged as to provide a compact system configuration.

Figure 11:
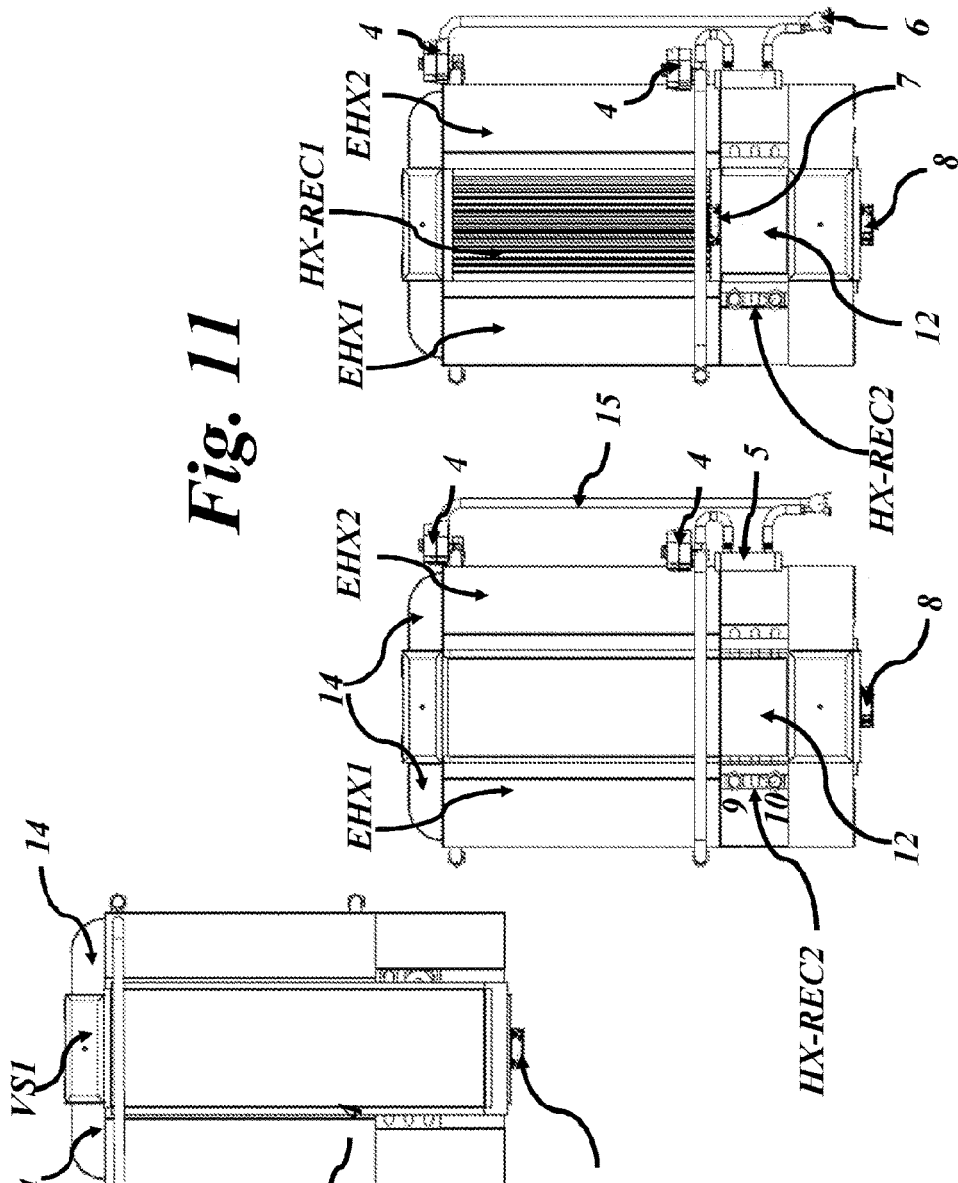
Figure 10:
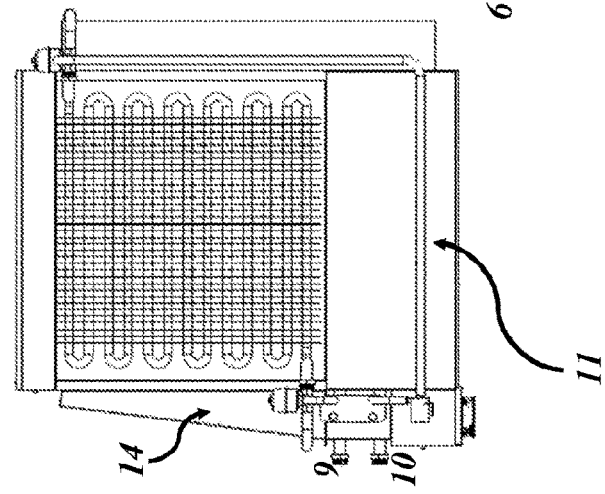

With reference to FIGS. 4 and 5, and to FIGS. 10 and 11, two air exchange valves VS1 and VS2 allow switching the beds 2, thus creating the closed circuit for the exchanger EHX in regeneration and putting the other exchanger EHX in communication with the outside environment.

With reference to FIG. 4(A), the valves VS1 and VS2 are in a position such that the exchanger EHX1 is in the desorption phase b), so that the exchanger EHX1 is insulated from the outside air, and the exchanger EHX2 is in the adsorption phase a), so that the exchanger EHX2 is in contact with the outside air.

In FIG. 4(B), on the contrary, the valves VS1 and VS2 are in a position such that the exchanger EHX2 is in the desorption phase b), so that the exchanger EHX2 is insulated from the outside air, and the exchanger EHX1 is in the adsorption phase a), so that the exchanger EHX1 is in contact with the outside air.

Therefore, in FIG. 4(A) the valve VS1 is closed for the exchanger EHX1 and open for the exchanger EHX2, and the valve VS2 is closed for the exchanger EHX1 and open for the exchanger EHX2.

On the contrary, in FIG. 4(B) the valve VS1 is open for the exchanger EHX1 and closed for the exchanger EHX2, and the valve VS2 is open for the exchanger EHX1 and closed for the exchanger EHX2.

Between the two exchangers EHX1 and EHX2, the first heat recovery block HX-REC1 is arranged. Downstream of the first recovery block HX-REC1 there are, in this order, the second heat recovery block HX-REC2, the condenser 12, and the condensed water collection tank 11 (see FIGS. 10 and 11).

Water is collected into the tank 11 by dripping vertically from the condenser 12.

The air is conveyed by means of converging bends and channels 14, and laps the two exchangers EHX1 and EHX2 to effect the above-mentioned transformations.

If the air flows are moved mechanically, the fans 7 and 8 may be arranged close to the air exchange valves VS1 and VS2 (see FIGS. 5, 10 and 11).

The components are sized for low load losses, and the maximum power of the fans 7 and 8 does not exceed 30 W. The fans 7 and 8 may be adjusted for treating a variable flow rate, in accordance with the control logics.

As an alternative, the regeneration heat may also be exploited for activating natural convection motions that will induce an air flow through the components.

Heat is supplied through an exchanger 5, which transmits the regeneration heat supplied by the heat source HS to the collectors 16 and distributed to the beds 2 through pipes 15.

A pump 6 circulates hot water in the pipes 15, and valves 4 distribute the flow only to the bed 2 under regeneration, i.e. in phase a), while no hot water circulates in the other exchanger EHX in phase b).

The condenser 12 yields the heat at ambient temperature to the heat sink through the collectors 9 and 10. The electric components for circulating the fluids 6, 7 and 8 and for actuating the switching valves SV1 and SV2 and the valve 4 have a maximum absorption of 70 W.

The system can work uninterruptedly, and the hours of operation depend on the availability of the thermal resource. Assuming that a solar thermal system is used, solar radiation is available, on average, eight hours a day, which correspond to the production of approximately forty-five litres of potable water for a flow rate of 100 m3/h of treated air.

Figure 6:
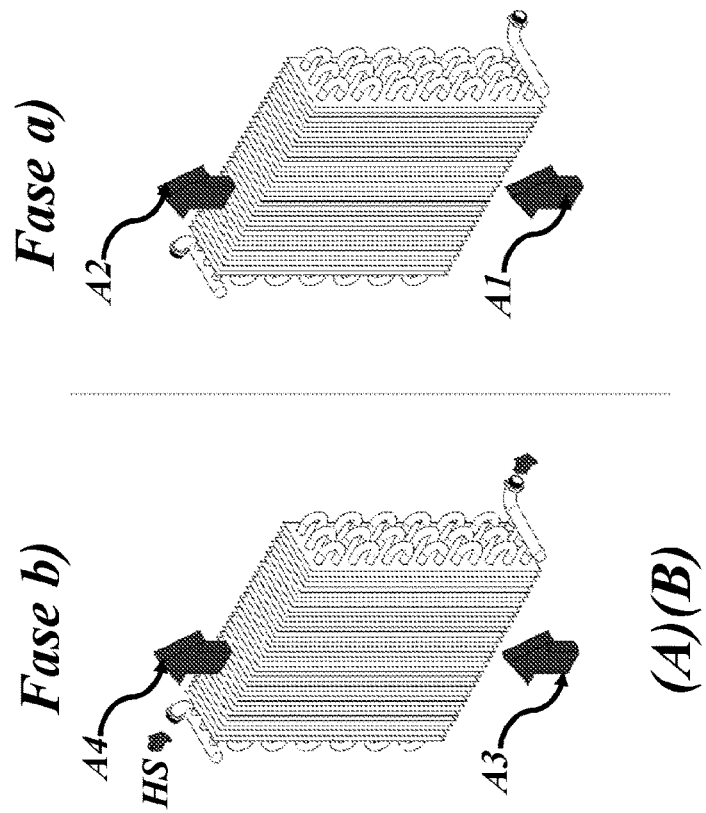

With reference to FIG. 6, the enthalpic exchanger EHX is shown in the two operating phases.

In particular, FIG. 6(A) shows the desorption phase b), and FIG. 6 (B) shows the adsorption phase a).

In a normal cycle, during phase a) the air at ambient temperature A1, coming from the outside, is conveyed towards the enthalpic exchanger EHX and, while flowing therethrough in contact with the adsorbent material, loses part of its moisture and generates a flow of dry air A2 at the exit of the exchanger EHX.

During phase b), an air flow A3 coming from the heat recovery block HX-REC is conveyed towards the enthalpic exchanger EHX, and at the same time the heat source HS supplies heat to the enthalpic exchanger EHX (hot air or water) and the flow A3, while passing through the exchanger EHX, is heated and acquires the moisture that was trapped in the adsorbent material during the previous phase, thereby generating the flow of hot and moist air A4, which is then sent to the condenser.

Figure 7:
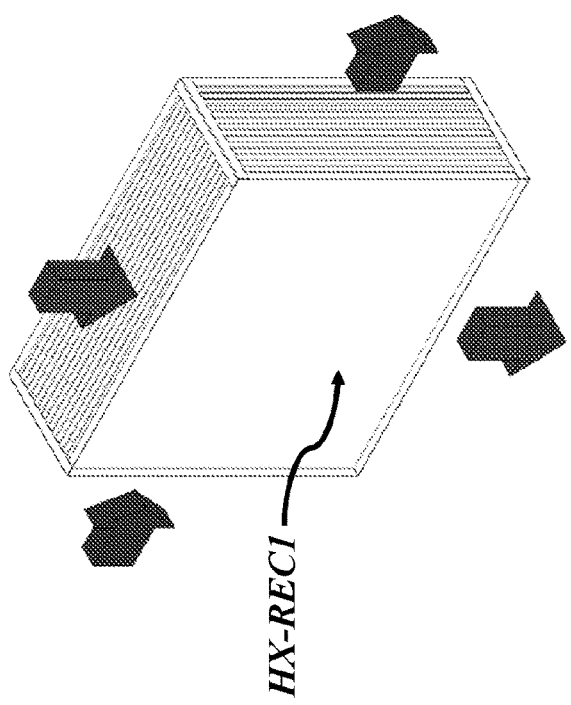

FIG. 7 illustrates an embodiment of a first heat exchanger HX-REC1, wherein the hot air moves from top to bottom and the cold air moves from left to right, wherein the terms top, bottom, left and right refer to the representation shown in FIG. 7.

FIG. 8 illustrates an embodiment of a second heat exchanger HX-REC2, wherein the hot and moist air moves from top to bottom and the cold and dry air moves from right to left, wherein the terms top, bottom, left and right refer to the representation shown in FIG. 8.

Figure 9:
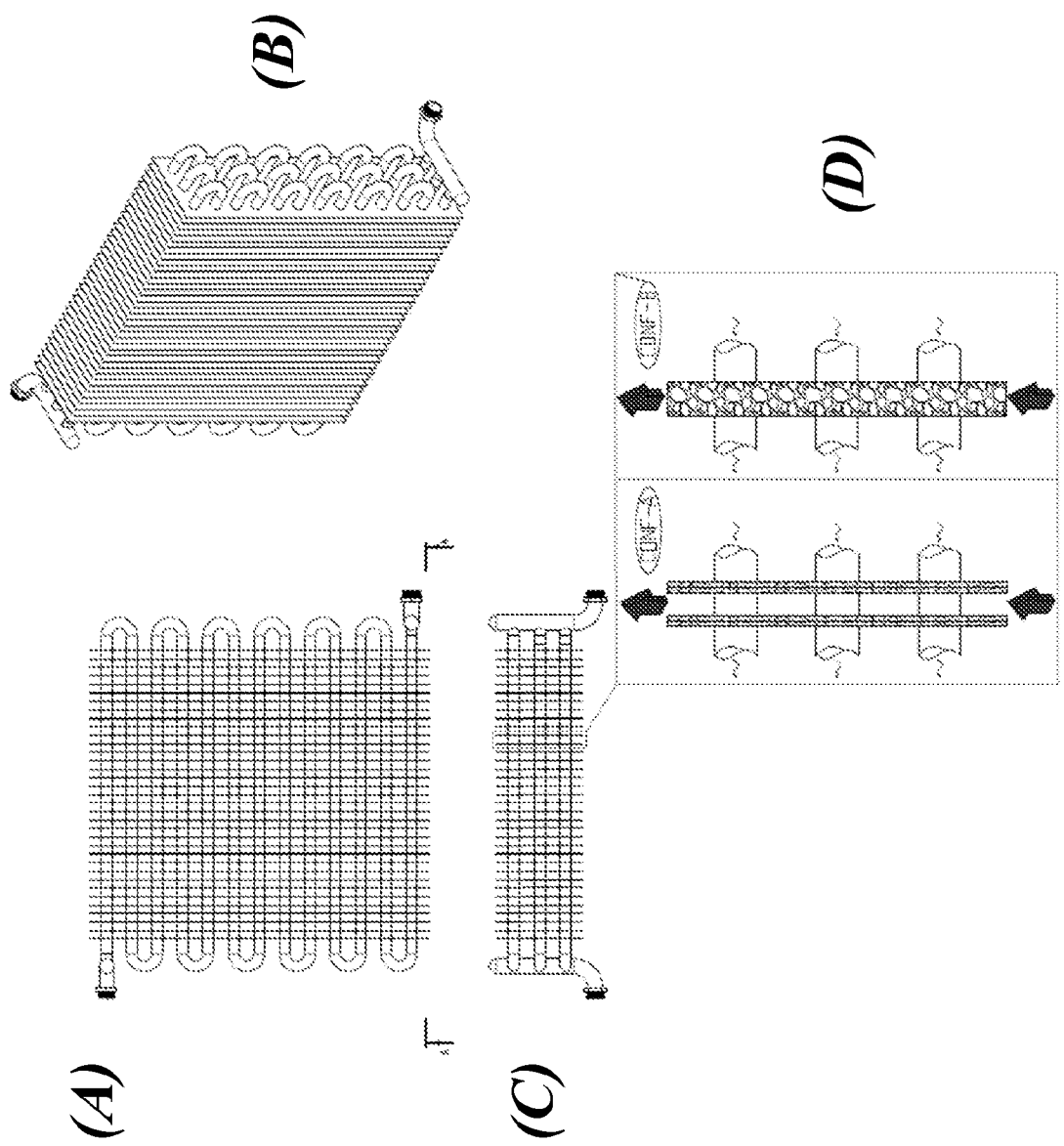

In particular, FIG. 9 shows an embodiment of the enthalpic exchanger EHX. FIG. 9A shows a side view, in which a plurality of metal elements, in the form of ducts or pipes, form a radiator in which a heated fluid (air or water) flows and yields heat to the outside environment. On such ducts a plurality of lamellar panels (see FIG. 9B) are arranged, which increase the exposure area. FIG. 9C shows a sectional view along the line AA indicated in FIG. 9A.

In the illustrated example there are three ducts like the one shown in FIG. 9A, mutually connected to two inlet and outlet valves.

FIG. 9D shows two different application configurations of the adsorbent material. In the first embodiment, the adsorbent material is applied onto the lamellar panels, for example, as a coating (by spraying, immersion or deposition), whereas in the second embodiment the adsorbent material is in granular form and is arranged between two adjacent panels.

Therefore, the air, as it flows through the machine, receives moisture from the adsorbent material (previously accumulated therein during phase a)) and receives heat from the exchange fluid circulating in the exchanger EHX.

The air flowing therethrough is not in direct contact with the exchange fluid, but a metallic contact surface is present. In particular, said metallic contact surface comprises the pipes or ducts in which the exchange fluid flows, as well as fins or lamellar panels. Lamellar panels provide a considerable increase in contact and exchange area.

The adsorbent material is distributed on the metallic surface of the pipes in which the exchange fluid flows and of the lamellar panels. As aforesaid, it may be in granular or panel form, or may be distributed on the metal elements to form a coating.

In summary, the following is provided:
i) an innovative reference thermodynamic cycle;
ii) a compact water production system for a family, or anyway a group of people, in dry climates;
iii) negligible power consumption (max. 70 W) compared with competing technologies;
iv) compatibility with the broadest possible range of thermal resources.

Furthermore, the proposed solution makes it possible to produce drinking and sanitary water within contexts of high aridity and inaccessibility of water resources: exploitation of the proposed cycle allows creating a compact system that can be sized to meet the water requirements of a family or a group of people; moreover, due to the inherent modular approach of the invention, it is possible to "assemble" the system to increase the production of liquid water as needed; the application can thus be broadened as a function of the user's requirements; notwithstanding the invention has been proposed herein for the production of sanitary and potable water, other fields of application actually exist as well, wherein the demand for water, conjugated with heat availability, makes it desirable to use this invention.

The advantages of the above-described solution will now be listed.

It exploits an isothermal transformation, as opposed to an isoenthalpic transformation; consequently, dimensions and space occupation, as well as the specific costs of the system per water mass unit produced, are lower when the thermodynamic cycle is based on an isothermal regeneration rather than an isoenthalpic one.

Low regeneration temperature: an additional advantage of the isothermal transformation over the isoenthalpic one lies in the fact that, the thermal-hygrometric conditions at the exit of the dehumidifying bed being equal, i.e. assuming that the cycle producibility is the same, the heat supply temperature in the isoenthalpic transformation case is distinctly higher; for example, supposing that the temperature at the bed exit is 45° C. with a relative humidity of 100%, if the condensation temperature is 35° C. there will be a water production of approx. 3 lt/hr; in the isoenthalpic transformation case, the inlet temperature is approx. 113° C., so that the heat supply temperature must be slightly higher than this value; in the isothermal transformation case, the heat supply temperature must be slightly higher than 45° C.; this aspect has an important practical and economical implication: the isoenthalpic transformation requires a heat supply at a distinctly higher temperature, i.e. a more precious primary resource compared with the isothermal transformation case; for the isothermal regeneration a low-temperature solar system may suffice (which is economical, requires little maintenance, has no operating costs, and uses low-skill technology), whereas for the isoenthalpic regeneration it will be necessary to employ either a high-temperature solar system (a more advanced technology with higher maintenance costs and complexity) or a combustion system (biomass or hydrocarbons), which greatly limits the applicability thereof in underdeveloped countries.

Closed regeneration cycle: the operating cycle is open during the adsorption phase, in order to accumulate water from the atmosphere; conversely, it is closed during the regeneration phase, i.e. it is always the same air that goes through the various phases, without being rejected into the outside environment before regeneration is complete; the latter is an important difference compared with other systems studied for and based on adsorbent materials; in particular, this measure further improves cycle producibility, reducing the waste resulting from the atmospheric exchanges occurring during the regeneration; in fact, the air exiting the condensation phase will have a relative humidity close to 100%, while ambient conditions are distinctly lower; for example, a dry climate has relative humidity values not exceeding 35%; if the regeneration air were directly rejected into the environment, also the water removed from the adsorbent material would be discharged; using as a reference the cycle already studied above, with regeneration at 45° C. and a condensation temperature of 35° C., approx. 3 lt/hr would be produced and approx. 2.5 lt/hr would be rejected into the environment; this rejected quantity, although heat was spent in order to extract it from the adsorbent material, cannot be recovered, which translates into wasted thermal energy; vice versa, in the closed cycle case this quantity is always recirculated in the system and requires no additional heat to be removed; specific consumption of heat per litre of condensed water in the above-mentioned hypotheses ranges from 2.7 kWh/lt in the closed cycle case to approx. 4.7 kWh/lt in the open cycle case.

Accordingly, a more efficient system will be smaller and more economical.

Low power consumption: the values of power consumption of the system presented herein are related to the auxiliary systems employed for moving the fluids involved, i.e. the fan for moving the regeneration air flow and the pump for recirculating the thermal fluid supplying the regeneration heat; moreover, in the case wherein water condensation occurs in dry conditions, i.e. by exploiting ambient air (e.g. at 35° C.), also the power consumption of the condenser's auxiliary units will have to be taken into account; with good approximation, and using a highly conservative approach, it can be estimated that the electric power values involved are the following: 20 W of electric power for the circulation pump; 30 W of electric power for moving the regeneration air (100 m3/h, with total load losses of 300 Pa); 350 W of electric power for moving the condensation air (dry cooler, 4,000 m3/h, with total load losses of 100 Pa), for a total of 400 W of electric power in the worst-case conditions; it is possible to make a comparison in terms of drawn electric power between the system presented herein and an equivalent vapour compression refrigeration machine, in equal operating and producibility conditions; in order to obtain a water flow rate of approx. 3 lt/hr from an environment at 35° C. and 35%, it is necessary to subtract approx. 6.3 kW of refrigeration power from the air; as relative humidity decreases (which is a typical condition of dry environments), this value increases; supposing that a conventional heat pump is used (COP=3), the compressor will have an electric absorption of approx. 2.1 kW; the thermal power at the condenser, to be discharged into the environment, will be 8.4 kW (versus 2.3 kW in the isothermal regeneration cycle); it is therefore reasonable to suppose that the power of the condenser fan will be considerably higher than the previously estimated 350 W; in conclusion, therefore, the system proposed herein has a maximum power consumption of 400 W, which is approx. 85% less than a conventional heat pump (COP=3) in equal operating conditions (2.7 kW); these 400 W can be easily derived from photovoltaic technology, whereas a compressor (which operates on alternating current) requires alternating current and therefore a passage through an inverter, resulting in higher installation costs and lower efficiency.

High environmental sustainability: no aggressive/toxic fluids; if combined with a solar thermal system, no gaseous emissions; thermally activated refrigeration cycles (absorption machines) utilize chemically aggressive and toxic fluids, such as ammonia, lithium bromide; vapour compression refrigeration machines utilize refrigeration fluids that generally have a strong impact on the environment (Global Warming Potential); for example, one of the fluids that are most commonly used for air conditioning purposes, R410a, has a GWP value of 2090, i.e. 1 kg of R410a released into the atmosphere has an effect on the environment that is equivalent to 2,090 kg of CO2.

Low skill technology: the types of adsorbent materials that are applicable to this cycle are numerous, ranging from high-performance precious materials, such as synthetic zeolites, to less expensive materials that still offer good performance in terms of ability to capture moisture from air, such as silica gel (3 €/kg); extremely poor materials are interesting as well, such as expanded clays with salt additives such as sodium chloride; the other components required for the operation of the cycle proposed herein are water/air exchangers, air/air exchangers, and low-temperature solar systems.

High adaptability, ranging from low scale to high scale.

The solution proposed herein operates by extracting water from air.

If dirty or contaminated water is available, it can be sprayed into the air being conveyed towards the machine for extracting water. At the end of the process, purified water will be obtained starting from dirty water vaporized into the air flow supplied to the machine.

Of course, without prejudice to the principle of the invention, the forms of embodiment and the implementation details may be extensively varied from those described and illustrated herein merely by way of non-limiting example, without however departing from the protection scope of the present invention as set out in the appended claims.

The invention claimed is:

1. A method for production of water from air, comprising cyclically and successively repeating the following two phases:
   a first phase a), which includes the following steps:
      a1) taking air from the outside,
      a2) conveying said air towards an enthalpic exchanger containing one or more surfaces and an adsorbent material in contact with said one or more surfaces, wherein said adsorbent material internally accumulates moisture that is present in said air, wherein said enthalpic exchanger comprises a plurality of lamellar panels and wherein said adsorbent material is applied onto said lamellar panels or is in granular form and is arranged between two adjacent lamellar panels of said enthalpic exchanger,
      a3) outputting dry air, and
   a second phase b), which includes the following steps:
      b1) supplying a quantity of sensible heat to said one or more surfaces of said enthalpic exchanger by means of a low-temperature heat source, thereby heating said adsorbent material of said enthalpic exchanger by conduction via contact between said one or more surfaces and said adsorbent material,
      b2) conveying an air flow through said enthalpic exchanger, wherein said air in contact with said enthalpic exchanger receives from said enthalpic exchanger (i) said quantity of sensible heat supplied by said low-temperature heat source to said one or more surfaces and said adsorbent material of said enthalpic exchanger and at the same time (ii) said moisture contained in said adsorbent material of said enthalpic exchanger, said quantity of sensible heat being such as to compensate for the temperature reduction caused by water evaporation at said adsorbent material in order to perform isothermal regeneration of said adsorbent material, and
      b3) bringing said air having received said quantity of sensible heat and said moisture from said enthalpic exchanger to ambient temperature in order to cause the moisture contained therein to condense, thereby obtaining water.

2. The method according to claim 1, wherein the second phase b) includes, between said step b2) and said step b3), an intermediate step b2.1) of recovering heat.

3. The method according to claim 2, wherein said intermediate step b2.1) of recovering the heat includes two steps:
   r1) heat recovery by means of an air/air exchanger, and
   r2) heat recovery by means of a liquid/air exchanger.

4. The method according to claim 3, wherein said intermediate step b2.1) of recovering the heat generates a closed cycle with recirculation of the air obtained after the steps of the second phase b), so as to recover the moisture still contained in the recirculating air.

5. The method according to claim 1, wherein two enthalpic exchangers are used, which work in parallel and in turn in the two phases a) and b), wherein in a first period of time the first enthalpic exchanger works in the first phase a) and the second enthalpic exchanger works in the second phase b), and in a second period of time the first enthalpic exchanger works in the second phase b) and the second enthalpic exchanger works in the first phase a).

6. The method according to claim 1, wherein said adsorbent material is in granular form and is arranged between two adjacent lamellar panels of said enthalpic exchanger.

\* \* \* \* \*